United States Patent
Kim et al.

(10) Patent No.: US 12,399,509 B2
(45) Date of Patent: Aug. 26, 2025

(54) AUTONOMOUS ROBOT AND ITS POSITION CORRECTION METHOD

(71) Applicant: SEOUL NATIONAL UNIVERSITY R&DB FOUNDATION, Seoul (KR)

(72) Inventors: Young Min Kim, Seoul (KR); Eun Sun Lee, Anyang-si (KR); Junho Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 113 days.

(21) Appl. No.: 18/403,305

(22) Filed: Jan. 3, 2024

(65) Prior Publication Data

US 2024/0219919 A1    Jul. 4, 2024

(30) Foreign Application Priority Data

Jan. 4, 2023  (KR) .................. 10-2023-0001363

(51) Int. Cl.
*G06V 20/56* (2022.01)
*G05D 1/246* (2024.01)
(Continued)

(52) U.S. Cl.
CPC ............ *G05D 1/246* (2024.01); *G06V 10/82* (2022.01); *G06V 20/56* (2022.01);
(Continued)

(58) Field of Classification Search
CPC .............. G05D 1/246; G05D 2111/54; G05D 2101/15; G05D 2111/10; G06V 10/82; G06V 20/56
See application file for complete search history.

(56) References Cited

U.S. PATENT DOCUMENTS

2022/0261682 A1   8/2022   Calderbank et al.
2022/0328296 A1   10/2022  Cao et al.

FOREIGN PATENT DOCUMENTS

KR           10-1167627 B1      7/2012
KR       10-2018-0109284 A     10/2018
(Continued)

OTHER PUBLICATIONS

Lee et al. "Self-Supervised Domain Adaptation for Visual Navigation with Global Map Consistency" *Proceedings of the IEEE/CVF winter conference on applications of computer vision.* 2022 (pp. 1-12).

(Continued)

*Primary Examiner* — Mathew Franklin Gordon
(74) *Attorney, Agent, or Firm* — NSIP Law

(57) ABSTRACT

An autonomous driving robot includes a driving unit that moves the autonomous robot; a camera; a traveling distance measurement sensor; and a control unit that estimates a location of the autonomous robot using a captured image and traveling distance information. In this case, the operation control program generates a robot viewpoint map based on the image captured by the camera, estimates a location of the autonomous robot based on the robot viewpoint map and the measured traveling distance information, and generates a global map based on the robot viewpoint map and position estimation information, and the operation control program inputs the generated robot viewpoint map and global map into a style-transfer model, and inputs a style-transferred robot viewpoint map and a style-transferred global map output by the style-transfer model into the operation agent to correct the estimated position.

17 Claims, 9 Drawing Sheets

(51) Int. Cl.
*G06V 10/82* (2022.01)
*G05D 101/15* (2024.01)
*G05D 111/10* (2024.01)
*G05D 111/50* (2024.01)

(52) U.S. Cl.
CPC ...... *G05D 2101/15* (2024.01); *G05D 2111/10* (2024.01); *G05D 2111/54* (2024.01)

(56) References Cited

FOREIGN PATENT DOCUMENTS

KR 10-2022-0002758 A 1/2022
KR 10-2022-0005001 A 1/2022

OTHER PUBLICATIONS

Lee et al. "MoDA: Map style transfer for self-supervised Domain Adaptation of embodied agents" *European Conference on Computer Vision. Cham: Springer Nature Switzerland*, 2022 (pp. 1-20).

200

AUTONOMOUS ROBOT AND ITS POSITION CORRECTION METHOD

CROSS-REFERENCE TO RELATED APPLICATION

This application is based on and claims priority under 35 U.S.C. § 119 to Korean Patent Application No. 10-2023-0001363, filed on Jan. 4, 2023, in the Korean Intellectual Property Office, the disclosure of which is incorporated by reference herein in its entirety.

BACKGROUND

1. Field

The present disclosure relates to a position correction method of an autonomous robot that may correct performance degradation due to various noises that exist when the autonomous robot is applied to a real environment.

2. Description of the Related Art

An autonomous robot that determines its own operating position is widely used for industrial or household purposes. In particular, recent autonomous robots use a method of learning on a simulator using information about visually realistic indoor spaces obtained through a 3D scanner. When the autonomous robot developed through such a research method is applied to the real environment, accurate position estimation becomes difficult due to a traveling distance measurement error or a control error, thereby deteriorating map generation performance, final task performing performance, or the like.

In order to solve such performance degradation, when the existing research is briefly considered, as a representative example of a real environment adaptation method, there is a method of learning by modeling noise existing in the real environment. For example, a research case was reported in which noise existing in a real space was modeled using a robot and then the autonomous robot is learned on a simulator that adds the noise model to data scanned in real 3D space. This method may minimize the difference between the simulator and the real environment and minimize performance degradation of the mobile robot learned in the simulation. However, there is a difficulty in understanding in advance and modeling the environment in which the robot is deployed.

The present disclosure proposes a position correction method of a robot capable of improving performance after correction in real time using a map generated in a new environment. In addition, the present disclosure proposes a position correction method of a robot in which a driving robot applied to a real environment corrects a map using regular characteristics of the indoor environment and uses a map generated during a previous driving time with small errors. In other words, the present disclosure relates to a technology in which position estimation performance of the robot may be corrected without actual measurement information.

In addition, the present disclosure proposes a method capable of easily improving position estimation performance even with an operation of only adding a correction algorithm to various existing driving robots. In addition, in the present disclosure proposes, as a method that is capable of being applied to the real environment in real time, a method is proposed, which is capable of performing correction based on non-supervision in an environment where actual measurement data does not exist during a short driving period of time.

Korea Patent No. 10-1167627 (Title of Invention: Device and method for double correction of position of mobile robot and map thereof)

SUMMARY

In order to solve the above-described problems, the present disclosure provides an autonomous robot that may correct its position using map data in which noise is minimized through a style-transfer model, and a position correction method using the same.

However, the technical problems that this embodiment aims to solve are not limited to the technical problems described above, and other technical problems may exist.

As technical means for achieving the above-mentioned technical problems, an autonomous driving robot according to one aspect of the present disclosure autonomous robot includes a driving unit that moves the autonomous robot; a camera; a traveling distance measurement sensor; and a control unit that executes an operation control program to control an operation of the autonomous robot through the driving unit and estimates a location of the autonomous robot using a captured image and traveling distance information collected through the camera and the traveling distance measurement sensor, in which the operation control program generates a robot viewpoint map based on the image captured by the camera at each time point through an operation agent, estimates a location of the autonomous robot based on the robot viewpoint map and the measured traveling distance information, and generates a global map based on the robot viewpoint map and position estimation information, and the operation control program inputs the generated robot viewpoint map and global map into a style-transfer model, and inputs a style-transferred robot viewpoint map and a style-transferred global map output by the style-transfer model into the operation agent to correct the estimated position.

In addition, a position correction method of an autonomous robot according to another aspect of the present disclosure includes receiving a captured image and traveling distance information for each viewpoint from a camera and a traveling distance measurement sensor installed on the autonomous robot, generating a robot viewpoint map based on the captured image through an operation agent, estimating a location of the autonomous robot based on the robot viewpoint map and the measured traveling distance information, and generating a global map based on the robot viewpoint map and position estimation information, inputting the generated robot viewpoint map and global map into a style-transfer model and outputting the style-transferred robot viewpoint map and the style-transferred global map, and correcting the position estimated in the generating of the robot viewpoint map based on the style-transferred robot viewpoint map and the style-transferred global map.

According to the solution to the above-described problem, the present disclosure may minimize robot position estimation errors caused by differences between the simulator and the actual environment. In particular, the present disclosure may correct the position through the process of style-transfer of the robot viewpoint map and the global map generated in the prior art, so it may be easily applied to robot systems that have already completed learning for autonomous traveling.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
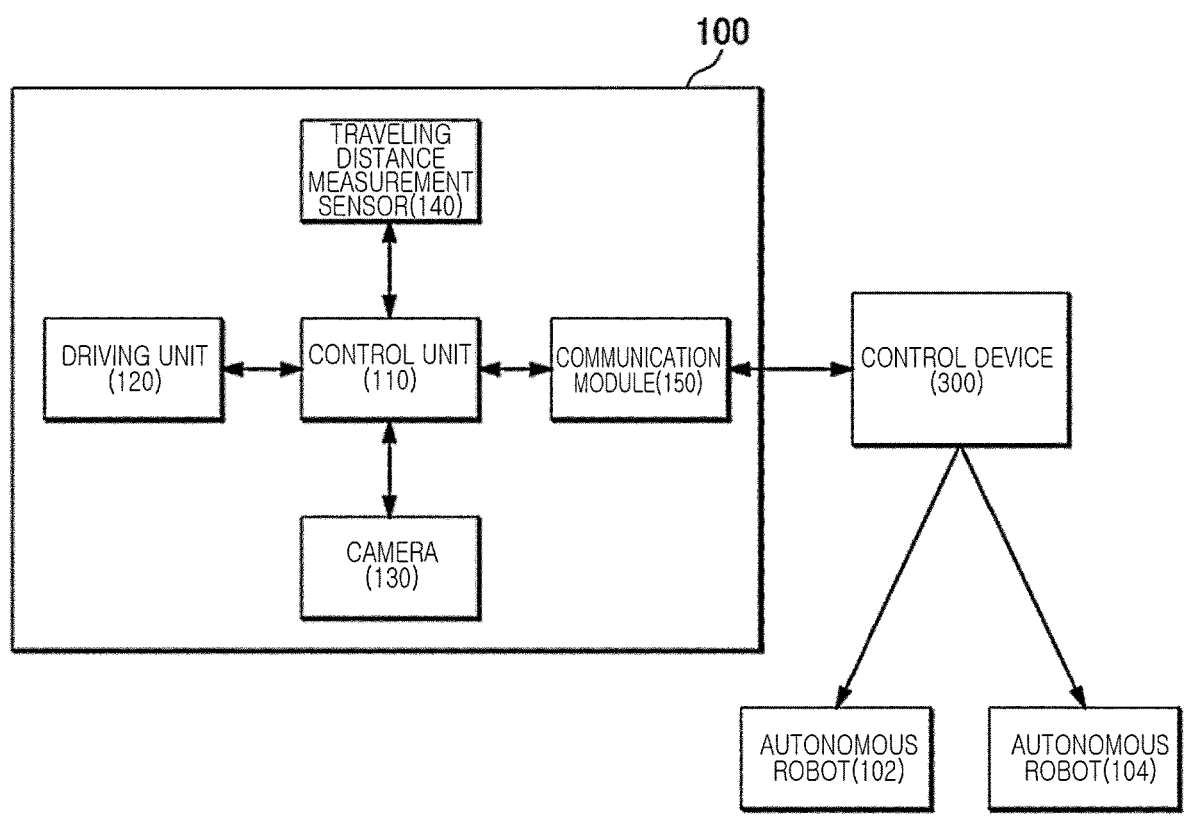
FIG. 1 is a block diagram showing a configuration of an autonomous robot according to an embodiment of the present disclosure.

Below, with reference to the attached drawings, embodiments of the present disclosure will be described in detail so that those skilled in the art may easily implement the present disclosure. However, the present disclosure may be implemented in many different forms and is not limited to the embodiments described herein. In order to clearly explain the present disclosure in the drawings, parts that are not related to the description are omitted, and similar parts are given similar reference numerals throughout the specification.

Throughout the specification, when a part is said to be "connected" to another part, this includes not only the case where it is "directly connected," but also the case where it is "electrically connected" with another element therebetween. In addition, when a part "includes" a certain component, this means that it may further include other components rather than excluding other components, unless specifically stated to the contrary.

In this specification, 'part' includes a unit realized by hardware, a unit realized by software, and a unit realized using both. In addition, one unit may be realized using two or more pieces of hardware, and two or more units may be realized using one piece of hardware. Meanwhile, '~ portion' is not limited to software or hardware, and '~ portion' may be configured to reside in an addressable storage medium or may be configured to reproduce one or more processors. Therefore, as an example, '~ portion' refers to components such as software components, object-oriented software components, class components, and task components, processes, functions, properties, and procedures, subroutines, segments of program code, drivers, firmware, microcode, circuits, data, databases, data structures, tables, arrays, and variables. The functions provided within the components and '~portions' may be combined into a smaller number of components and '~portions' or may be further separated into additional components and '~portions'. In addition, components and '~portions' may be implemented to regenerate one or more CPUs within a device or a secure multimedia card.

The autonomous robot mentioned below may be implemented as a computer or portable terminal that may connect to a server or other terminal through a network. Here, the computer includes, for example, a notebook, desktop, laptop, etc. equipped with a web browser, and the portable terminal is, for example, a wireless communication device that guarantees portability and mobility, and may include all types of handheld-based wireless communication devices such as various mobile communication-based terminals, smartphones, tablet PCs, etc. In addition, "network" may be implemented with any type of wireless network of a wired network such as a Local Area Network (LAN), Wide Area Network (WAN), or Value Added Network (VAN), a mobile radio communication network, or a satellite communication network.

FIG. 1 is a block diagram showing a configuration of an autonomous robot according to an embodiment of the present disclosure.

With reference to FIG. 1, an autonomous robot 100 includes a control unit 110, a driving unit 120, a camera 130, a traveling distance measurement sensor 140, and a communication module 150.

The control unit 110 executes an operation control program of the autonomous robot, controls the operation of the autonomous robot 100 through the driving unit 120, and corrects a position of the autonomous robot using image and distance measurement information collected through the camera 130 and the traveling distance measurement sensor 140. Details of the operation control program will be described later. In addition, the control unit 110 includes a memory for storing the operation control program, a processor for executing the operation control program, and the like.

The driving unit 120 includes a driving motor, wheels, and the like for driving the autonomous robot 100, and may support forward movement, left turn, right turn, or backward movement of the autonomous robot 100. Meanwhile, there are no separate restrictions on the number or location of motors placed in the autonomous robot 100, the number or location of wheels, driving method, and the like.

The camera 130 captures a state in front of or around the autonomous robot 100, and one or more cameras 130 may be placed. The camera 130 may capture RGB information or RGB-D information that further includes depth information.

The traveling distance measurement sensor 140 is a sensor that measures the traveling distance of the autonomous robot 100 and may be implemented as, for example, an odometry sensor. The traveling distance measurement sensor 140 measures a moving distance from a starting point using an encoder attached to the wheel or the like, and measures a rotational state of a center of the robot. When using the traveling distance measurement sensor 140, position estimation performance may deteriorate due to a traveling distance measurement error. This will be separately described.

The communication module 150 may include one or more components that transmit and receive various types of data with an external computing device or control device 300. For example, the communication module 120 may be a device that includes hardware and software necessary to transmit and receive signals such as control signals or data signals through wired or wireless connections with other network devices.

In addition, a plurality of autonomous robots 100, 102, and 104 may travel in a target space, and the control device 300 may be disposed to monitor states thereof and transmit control commands to adjust the traveling state. The control device 300 is built in the form of a server and may transmit the control commands to each autonomous robot or collect information about the current position of each autonomous robot. In addition, the control device 300 may store map information about the target space in advance or may generate a map for the target space through merging of maps generated for each autonomous robot. This will be described in detail later.

A position error that occurs when estimating the position of the autonomous robot described above will be explained in more detail.

Figure 2:
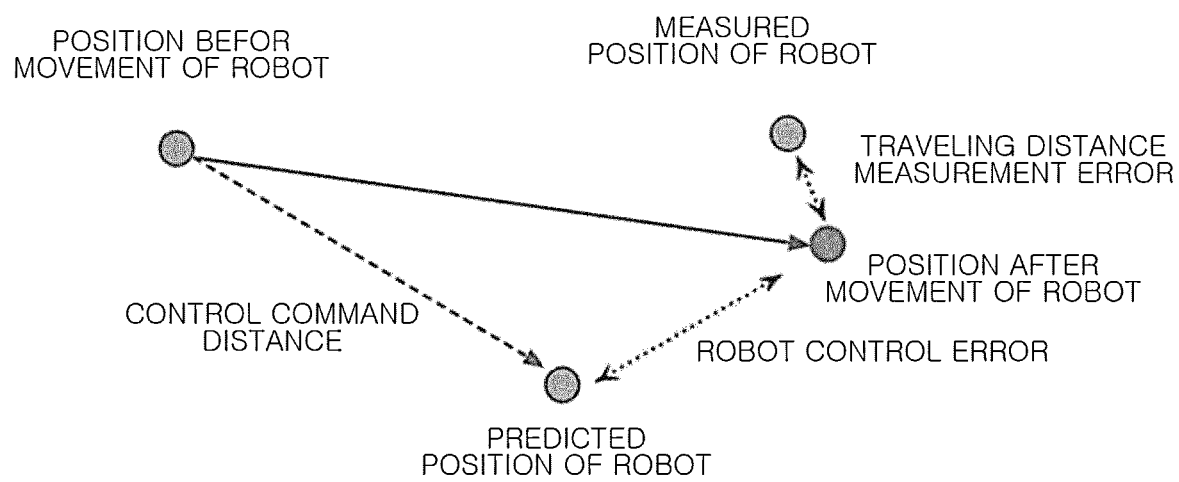
FIG. 2 is a diagram for explaining a cause of an error in position estimation in an autonomous robot.

FIG. 2 is a diagram for explaining a cause of an error in position estimation in the autonomous robot.

The odometry sensor is a sensor that measures the traveling distance, uses an encoder, or the like to measure the moving distance from the starting point and a rotational state of the robot. When using such an odometry sensor, the position estimation performance may deteriorate due to the traveling distance measurement error. Even if there are no errors in actual traveling of the autonomous robot, position estimation may become inaccurate due to errors in measurement values. For example, if the robot travels 1 m straight, but obtains a sensor value indicating that it travels 0.8 m due to a measurement error in the traveling distance measurement sensor, a measurement error of 0.2 m occurs. In addition to the measurement error, most autonomous robots also have a control error. The control error may occur due to motor control or due to friction with a floor. For example, when the autonomous robot, which receives a control command instructing to travel 1 m straight, travels 1.5 m straight, an error of 0.5 m occurs. Such traveling distance measurement error and control error may occur simultaneously as shown in FIG. 2, thereby causing an error in position estimation.

Figure 3:
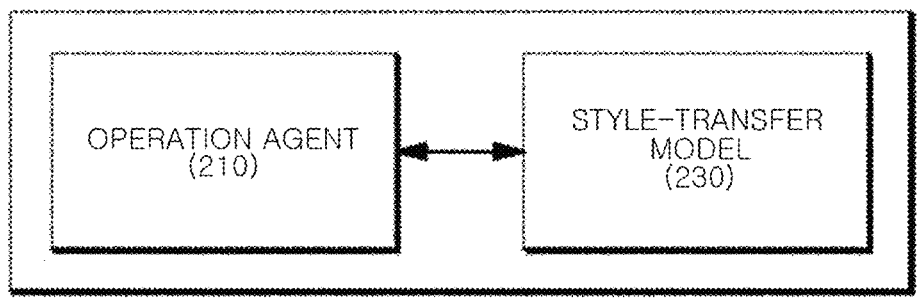
FIG. 3 is a diagram showing a detailed configuration of an operation control program mounted on an autonomous robot according to an embodiment of the present disclosure.

FIG. 3 is a diagram showing a detailed configuration of an operation control program mounted on the autonomous robot according to an embodiment of the present disclosure.

With reference to FIG. 3, an operation control program 200 includes an operation agent 210 and a style-transfer model 230. The operation control program 200 generates, through the operation agent 210, robot viewpoint maps indicating a surrounding area of a point where the autonomous robot is located, based on captured information of the camera 130 at each viewpoint, and connects them to generate a global map representing the entire target space. In addition, the operation agent 210 estimates the position of the autonomous robot based on the robot viewpoint map and the traveling distance information measured through the traveling distance measurement sensor 140. In addition, the operation agent 210 generates the global map representing the entire area of the target space based on the robot viewpoint map and position estimation information. In addition, the operation agent 210 uses the robot viewpoint map and the global map to adjust the operation status and confirm the location of the autonomous robot.

Then, the operation control program 200 inputs the robot viewpoint map and the global map generated through the operation agent 210 into the style-transfer model 230, and generates a style-transferred robot viewpoint map and a style-transferred global map, and transmits those to the operation agent 210 so that the operation agent 210 corrects the previously estimated location information.

First, an operation of the operation agent 210 will be described.

Figure 4:
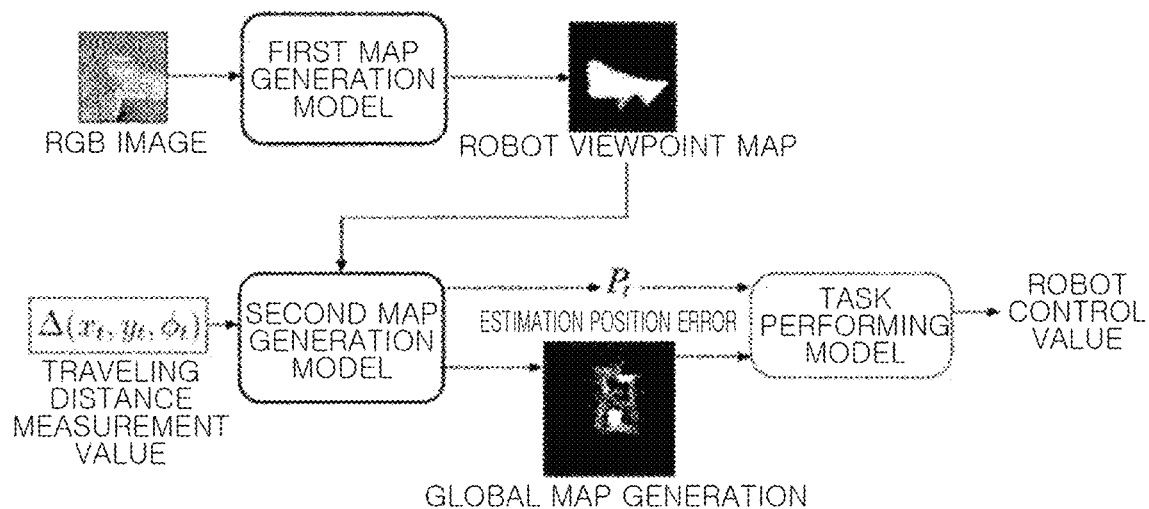
FIG. 4 is a diagram showing a detailed operation of an operation agent according to an embodiment of the present disclosure.

FIG. 4 is a diagram showing a detailed operation of the operation agent according to an embodiment of the present disclosure.

With reference to FIG. 4, the operation agent 210 includes a first map generation model that generates the robot viewpoint map representing the area around the autonomous robot based on the captured information of the camera 130 and a second map generation model that estimates the location of the autonomous robot based on the traveling distance information measured through the traveling distance measurement sensor 140 and the robot viewpoint map, and generates the global map representing the entire area of the target space.

Figure 5:
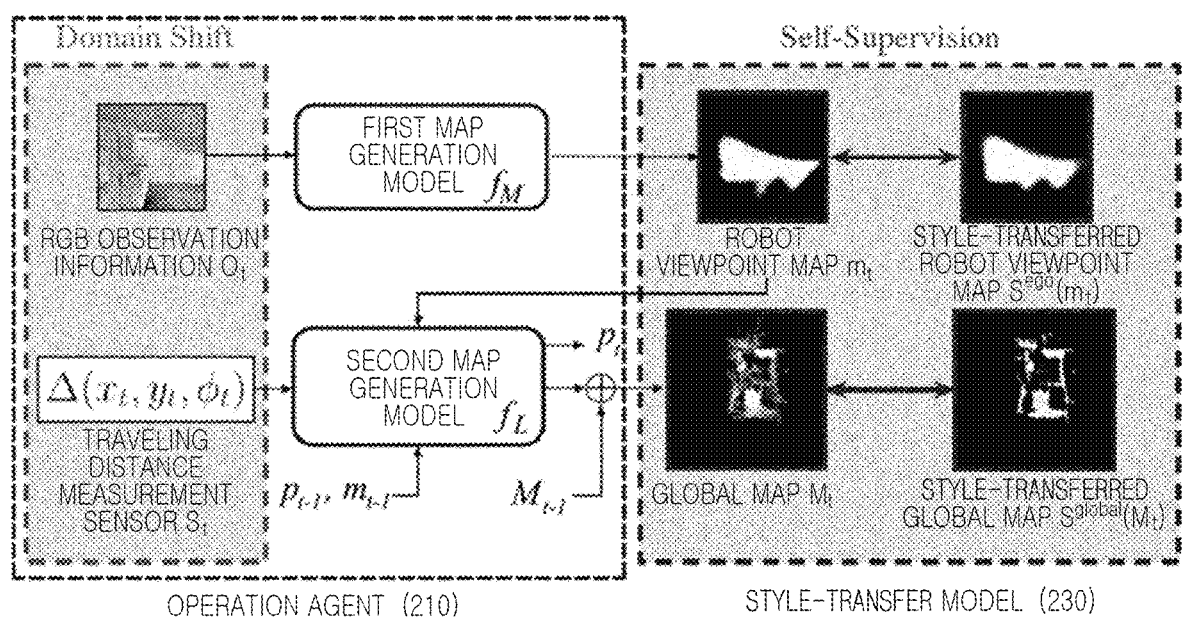
FIG. 5 is a diagram showing a detailed configuration of an operation control program mounted on an autonomous robot according to an embodiment of the present disclosure.

With reference to FIGS. 4 and 5, a first map generation model $f_M$ generates the robot viewpoint map (egocentric map) of the autonomous robot using an RGB image or an RGB-D image $o_t$ captured by the camera. The robot viewpoint map is a map generated based on the image captured by the camera at each moving location of each autonomous robot, and is generated in the form of a 2-D map that may be confirmed by the image captured at each location. The robot viewpoint map may be formed in a top-down view. The robot viewpoint map is generated using images captured at preset times (time stamps), and location estimation is performed using this. When robot viewpoint maps described above are connected to each other, the global map representing the entire space may be generated. Meanwhile, the first map generation model, which generates the robot viewpoint map based on the RGB image, is built based on deep learning, predicts a depth from the RGB image and performs projection thereof to the robot viewpoint map of the 2-D top-down view form to be learned.

Meanwhile, the first map generation model generates a robot viewpoint map $m_t$ at the current time point, and a robot viewpoint map $m_{t-1}$ at the previous time point and the robot viewpoint map $m_t$ at the current time point are transmitted to a second map generation model $f_L$ to be used for estimating the current location of the autonomous robot.

The second map generation model $f_L$ performs an operation of estimating the location of the autonomous robot and an operation of generating the global map based on sensing information x, y, and φ measured through the traveling distance measurement sensor. The traveling distance measurement sensor 140 measures location (x, y) information in the form of 2-D coordinates and rotation (φ) information of the robot for each measurement time, and the second map generation model uses these to estimate the position of the autonomous robot every hour. In other words, the second map generation model may estimate the position $P_t$ of the autonomous robot based on a traveling distance $\Delta P_t$ of the autonomous robot obtained through the robot viewpoint map and moving path information that are in a temporally continuous relationship with each other. For example, a deep learning model that predicts the error of the traveling distance of the robot measured based on the robot viewpoint map $m_{t-1}$ at the previous time point t−1 transferred to the current robot viewpoint by 2-D changes Δx, Δy, and Δθ based on the traveling distance, and the robot viewpoint map $m_t$ at the current time point t. In addition, the second map generation model uses the position $P_{t-1}$ of the robot estimated at the previous time point, the traveling distance $\Delta P_t$ of the robot measured through odometry, and the error in the predicted traveling distance to calculate the current position $P_t$ of the robot. Assuming that the starting position of the robot is (0, 0, 0), the traveling distance $\Delta P_t$ of the robot between respective time points measured in odometry is continuously added to calculate the position of the robot at each time point as a global position value that may be connected by one path. The global map $M_t$ may be generated when the robot rearranges and connects the robot viewpoint maps generated at each viewpoint to the global position at each viewpoint. Therefore, in order to generate the global map in real time, the robot viewpoint map $m_t$ at the current time point is rearranged based on the robot position $P_t$ in the previously estimated global viewpoint, and is merged to the global map $M_{t-1}$ at the previous time point to generate the global map $M_t$ of the current time point.

That is, the second map generation model is responsible for estimating the robot position. The global map is completed by connecting the given robot viewpoint maps through the first map generation model. Therefore, when a loss function defined using the global map is back-propagated to the second map generation model, there is no change in a robot viewpoint map prediction result, and only a weight of the second map generation model may be changed to correct the position estimation performance.

In this way, the operation agent 210 generates the robot viewpoint map, estimates the current location of the robot, and performs the operation of generating the global map based thereon. However, as described above, there is a possibility that errors may occur in the position estimation result due to noise occurring in the real environment, and the style-transfer model 230 is added to resolve this. In a noise-free simulator environment, the operation agent 210 may learn each map generation model from the location $P_t$ representing a ground truth and the robot viewpoint map $m_t$, but in the real environment, ground truth data cannot be secured due to the traveling distance measurement error or the control error described above. Accordingly, in the self-supervision method according to the present disclosure, a map generated incorrectly due to errors occurring in the real environment is transferred to match characteristics of the indoor environment through the style-transfer model 230 to perform position correction.

Figure 6:
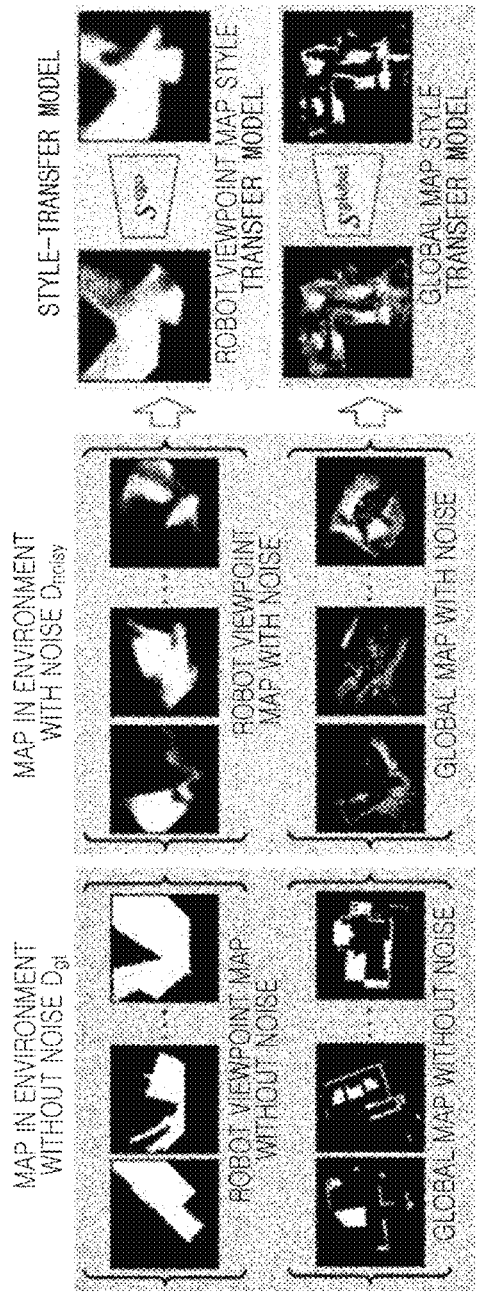
FIGS. 6, 7, and 8 are diagrams for explaining a process of building a style-transfer model of the operation control program mounted on the autonomous robot according to an embodiment of the present disclosure.
Figure 7:
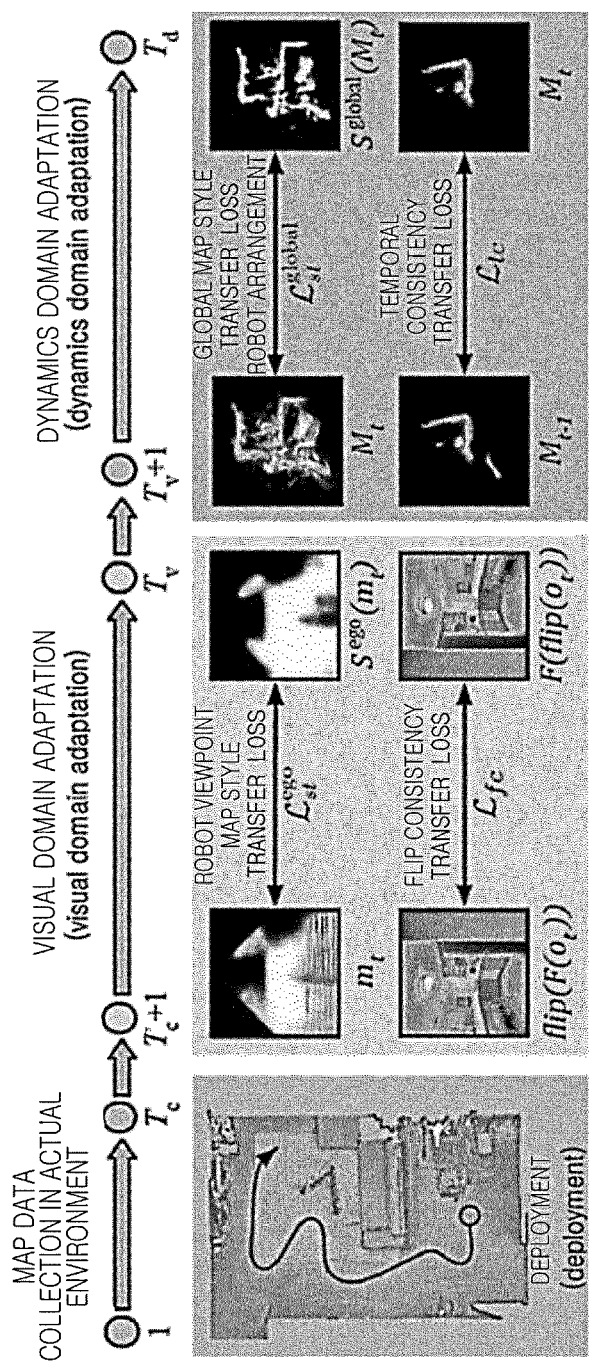
Figure 8:
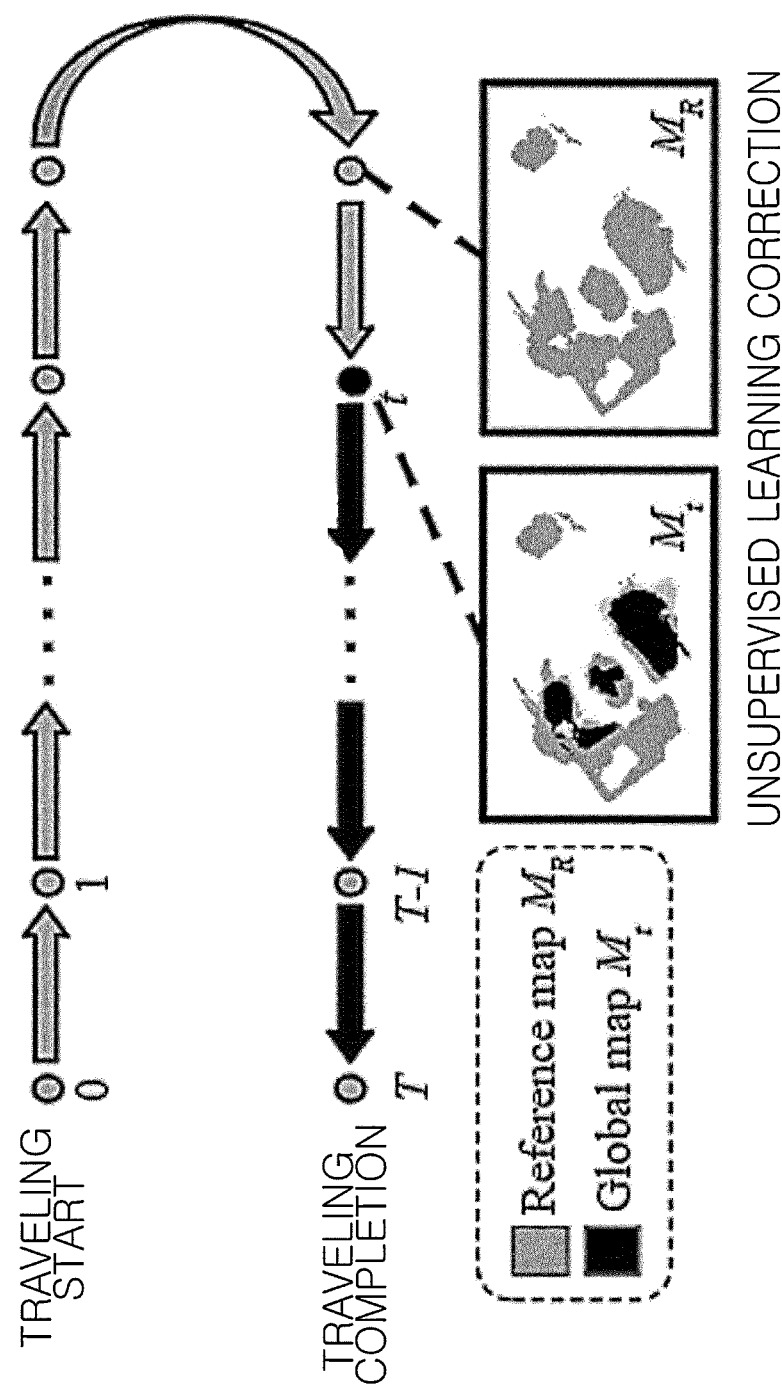

FIG. 5 is a diagram showing a detailed configuration of the operation control program mounted on the autonomous robot according to an embodiment of the present disclosure, and FIGS. 6 to 8 are diagrams for explaining a process of building a style-transfer model of the operation control program mounted on the autonomous robot according to an embodiment of the present disclosure.

The detailed configuration of the operation agent 210 is the same as that previously described with reference to FIG. 4.

With reference to FIG. 5, the style-transfer model 230 is learned to transfer a map generated incorrectly due to errors occurring in the real environment to fit the characteristics of the indoor environment, and, in the present disclosure, is learned according to the self-supervision method.

The style-transfer model 230 learns two image sets in which a corresponding pair does not exist, and transfers the images applying the style of a first image set to a second image set. At this time, such transfer may be learned using an image generation model that uses a cycle consistency loss function. For example, using a learning model known as CyleGAN, the style of the first image set with error-free is applied to the second image set of images including uncorrected map image data. For reference, the CycleGAN learning model, unlike the typical GAN (Generative Adversarial Network), is known as a learning model that uses a configuration including two generators and a discriminator, and causing the style characteristics to be transferred between two groups of images with different styles. Since the learning model corresponds to prior art, further description of the detailed configuration thereof will be omitted.

The first image set learned by the style-transfer model 230 includes vertical and formal indoor space characteristics and includes the ground truth answer image generated through the simulator described above. In addition, the second image set includes the robot viewpoint map or the global map generated using images and sensor information collected in the real environment where noise exists.

With reference to FIG. 6, considering the learning process of the style-transfer model 230 in more detail, a first image set $D_{gt}$ including the robot viewpoint map or the global map corresponding to the ground truth is generated. The first image set is generated through the simulator or the like, may obtain formal characteristics of the indoor environment, and includes the noise-free robot viewpoint map or the global map.

Next, the autonomous robot is placed in an actual traveling environment and is traveled, and the robot viewpoint map and the global map are generated through the operation agent 210 during the traveling process. At this time, noise is not removed from the robot viewpoint map and the global map, and a second image set $D_{noisy}$ including the robot viewpoint map and the global map collected in this way is generated. Meanwhile, in the present disclosure, since the learning model is built according to the CycleGan model, each image included in the first image set and the second image set does not need to have a correspondence relationship with each other.

Next, a map style-transfer model is built using the CycleGan model. More specifically, a robot viewpoint map style-transfer model is built using the first image set and the second image set for the robot viewpoint map, and a global map style-transfer model is built using the first image set and the second image set for the global map. Through this, the styles of the robot viewpoint map including noise and the global map including noise may be transferred to the styles of the robot viewpoint map without noise and the global map without noise, respectively.

The style-transfer model 230 performs learning based on a loss function with which cycle consistency of a learning model G that allows the first image set X to be transferred to the second image set Y, and a learning model F that allows the second image set to be transferred to the style of the first image set is secured by the following equation.

$$F(G(X)) \approx X, G(F(Y)) \approx Y \qquad \text{[Equation 1]}$$

Then, the style-transferred robot viewpoint map and the style-transferred global map output from the style-transfer model 230 are transmitted to the operation agent, and the operation agent 210 corrects the location information estimated through the robot viewpoint map before style-transfer and the global map before style-transfer.

In addition, as shown in FIG. 7, the first map generation model $f_M$ is further learned using the style-transferred robot viewpoint map that does not include noise by the style-transfer model 230, and the style is transferred. Additional learning of the second map generation model $f_L$ is further learned using the style transferred global viewpoint map.

$$\mathcal{L}_{st}^{ego} = \sum_{t=T_c+1}^{T_v} \|m_t - S^{ego}(m_t)\|_2 \qquad \text{[Equation 2]}$$

In Equation 2, $T_c$ represents the time when collection of map data sets in the real environment ends, $T_v$ represents the time when visual domain adaptation ends, and $m_t$ is the input robot viewpoint map including noise and is included in the image set, and $S^{ego}(m_t)$ refers to the output robot viewpoint map that is style-transferred so that noise is removed by style-transfer. The loss function of the robot viewpoint map style-transfer is designed to minimize a difference between the input robot viewpoint map and the output robot viewpoint map style style-transferred by the style-transfer model using an average square error function. The style-transfer model 230 is learned through this process. Then, the first map generation model $f_M$ is additionally learned using the robot viewpoint map that is style-transferred by the style-transfer model 230.

$$\mathcal{L}_{st}^{global} = \sum_{t=T_v+1}^{T_d} \|M_t - S^{global}(M_t)\|_2 \qquad \text{[Equation 3]}$$

In Equation 3, $T_v$ represents the time when visual domain adaptation ends, $T_d$ represents the time when dynamic domain adaptation ends, and represents the time when the position correction algorithm ends, and $M_t$ is the input global map including noise and is included in the second image set, and $S^{global}(M_t)$ refers to the output global map that is style-transferred so that noise is removed by style-transfer. The loss function of the global map style-transfer is designed to minimize the difference between the input global map and the output global map that is style-transferred by the style-transfer model using the average square error function. The style-transfer model 230 is learned through this process. Then, the second map generation model $f_L$ is additionally learned using the global map that is style-transferred by the style-transfer model 230. In addition, the second map generation model $f_L$ may perform learning based on a loss function that secures temporal consistency in order to prevent a decrease in map generation consistency due to time difference. As defined in Equation 4, the loss function uses the average square error function to minimize the difference between the global map at the current time point and the global map at the previous time point.

$$\mathcal{L}_{tc} = \sum_{t=T_v+1}^{T_d} \|M_t - M_{t-1}\|_2 \qquad \text{[Equation 4]}$$

Meanwhile, the loss function for ensuring the temporal consistency may be implemented in other forms. As shown in FIG. 8, the map generated in the current traveling step is defined as $M_t$, and the past map (reference map) that may define the time difference consistency loss function may be defined as one of all maps generated before the current traveling step. Therefore, by defining the map generated during a period from traveling step 0 to t−1 as the reference map ($M_R$), the loss function may be defined as follows.

$$\mathcal{L}_{tc} = \sum_{t=T_c+1}^{T_d} \|M_t - M_R\|_2. \qquad \text{[Equation 5]}$$

In other words, as defined in Equations 4 and 5, the loss function that secures time difference consistency based on the global map at the current time point and the global map at the previous time point (including the immediately previous time point) may be used.

In addition, the first map generation model $f_M$ may perform learning using the loss function of a flip consistency such as Equation 6 to ensure flip consistency. That is, as shown in FIG. 7, even if the image captured through the camera is flipped horizontally, the consistency of the robot viewpoint map generated thereby is remained.

$$\mathcal{L}_{fc} = \sum_{t=T_c+1}^{T_v} \|\text{flip}(F(o_t)) - F(\text{flip}(o_t))\| \qquad \text{[Equation 6]}$$

In other words, the difference between the characteristics extracted by the characteristic extraction function F for the captured image $o_t$ being flipped and the characteristics extracted by the characteristic extraction function F after the captured image of is flipped is minimized, and the first map generation model $f_M$ is learned to maintain flipping consistency through this process.

In this way, the first map generation model of the operation agent 210 may be built by weighting the style-transfer loss function for the robot viewpoint map defined by Equation 2 and the loss function for ensuring the flip consistency defined by Equation 6. In addition, the second map generation model may build a learning model using the style-transfer loss function for the global map defined by Equation 3 and the loss function for ensuring the time difference consistency defined by Equation 4 or 5. In this case, a final loss function may be designed by weighting each loss function.

Figure 9:
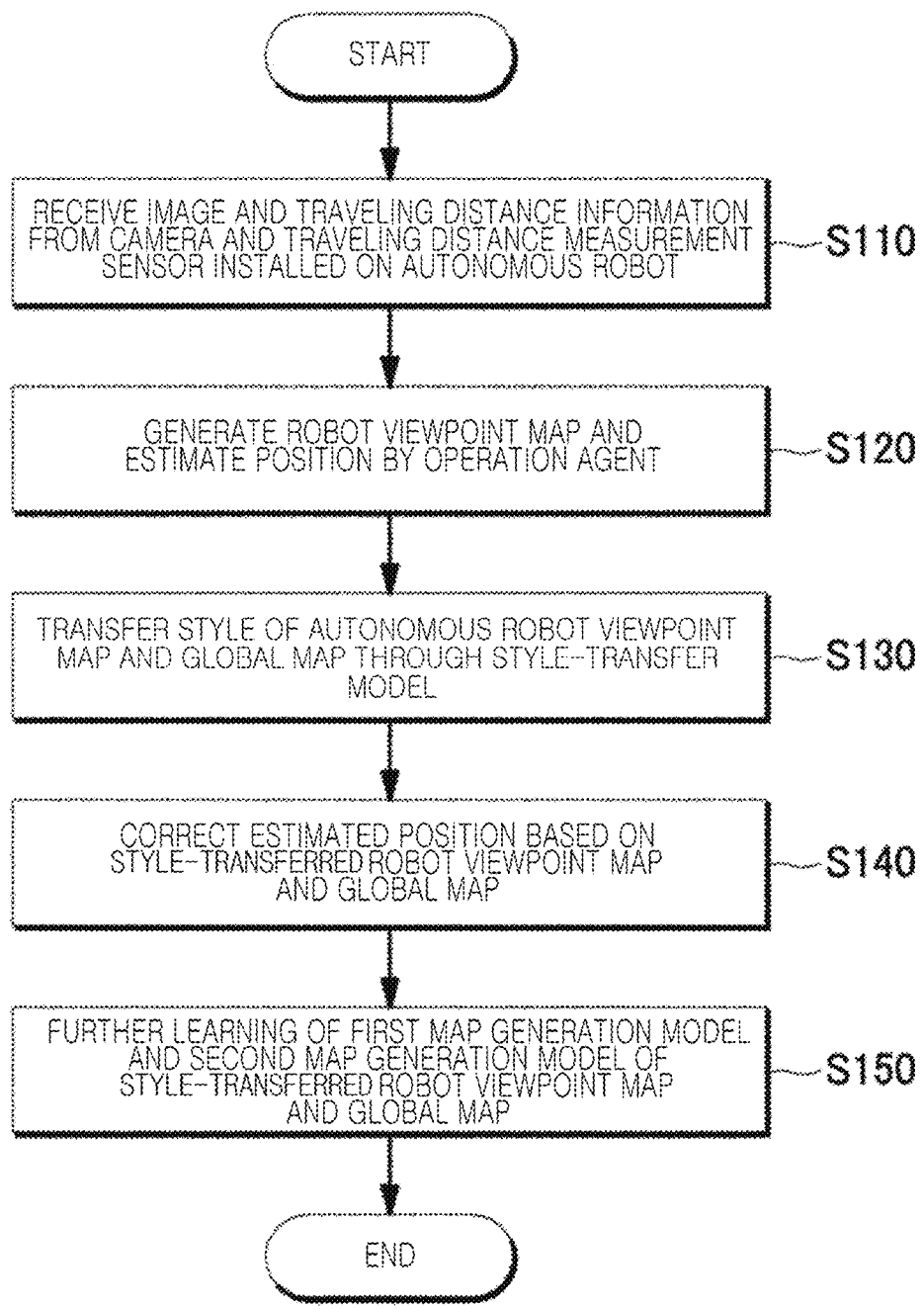
FIG. 9 is a flowchart showing a position correction method of an autonomous robot according to an embodiment of the present disclosure.

FIG. 9 is a flowchart showing a position correction method of an autonomous robot according to an embodiment of the present disclosure.

First, a captured image and traveling distance information are received for each viewpoint from the camera 130 and the traveling distance measurement sensor 140 installed on the autonomous robot (S110). At this time, each capturing time and the measurement time of the sensor are synchronized and may be set according to preset time intervals.

Next, the operation agent 210 of the operation control program 200 generates the robot viewpoint map based on the captured image, estimates the location of the autonomous robot based on the robot viewpoint map and the traveling distance information, and generates the robot viewpoint map and the global map based on the position estimation information (S120). As shown in FIG. 4, the first map generation model generates the robot viewpoint map $m_t$ at the time point t based on the captured image. In addition, the second map generation model compares the robot viewpoint map $m_{t-1}$ at the previous time point t−1 with the robot viewpoint map $m_t$ at the current time point t, and estimates the position $P_t$ of the autonomous robot at the current time point based on based on the traveling distance of the autonomous robot to the current time point. In addition, the second map generation model transfers the robot viewpoint map $m_t$ at the current time point based on the current location $P_t$ of the autonomous robot and merges it with the global map $M_{t-1}$ at the previous time point to generate the global map $M_t$ of the current time point.

Next, the style-transfer model 230 of the operation control program 200 inputs the robot viewpoint map and the global map into the style-transfer model 230, and outputs the style-transferred robot viewpoint map and the style-transferred global map (S130). The specific configurations of the style-transfer model 230 is as those described above, and through such a process, the robot viewpoint map and the global map with minimized noise or error may be generated.

Next, the operation agent 210 of the operation control program 200 corrects the position estimated in the previous step S120 based on the style-transferred robot viewpoint map and the style-transferred global map output in the previous step S130 (S140).

That is, as shown in FIG. 5, the style-transferred robot viewpoint map $S^{ego}(m_t)$ at the time point t is generated based on the robot viewpoint map $m_t$ at the time point t, and the position at the time point t re-estimated based on the distance measurement information at the time point t and the style-transferred robot perspective map $S^{ego}(m_t)$ at the time point t thereby correcting the position estimation value.

Next, the operation agent 210 of the operation control program 200 additionally learns the first map generation model and the second map generation model based on the style-transferred robot viewpoint map and the style-transferred global map. The first map generation model may be further learned based on the style-transferred loss function of the robot viewpoint map defined by Equation 2 as described above. In addition, the first map generation model may be further learned based on the flip consistency loss function defined by Equation 6. In addition, the second map generation model may be further learned based on the style-transferred loss function of the global map defined by Equation 3. In addition, the second map generation model may be further learned based on the temporal difference consistency loss function defined by Equation 4 or 5.

Although the style-transferred map cannot build the loss function using accurate information like the ground truth map, it builds the loss function that allows each map generation model to learn the style for the noise-free map. The map generation model corrected through this additional learning may estimate the position of the robot more robustly to noise included in the map than that in the existing model.

Figure 10:
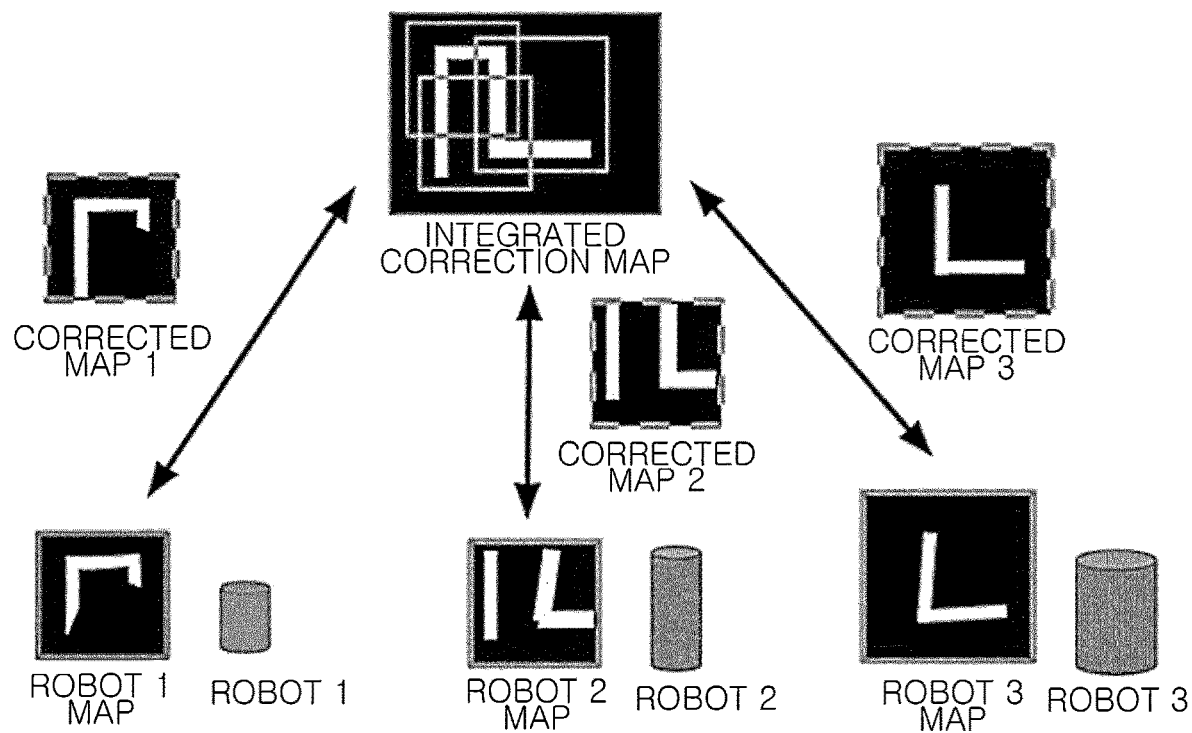
FIG. 10 is a diagram showing a process of applying a position correction algorithm of the autonomous robot according to an embodiment of the present disclosure.

FIG. 10 is a diagram showing a process of applying a position correction algorithm of the autonomous robot according to an embodiment of the present disclosure.

As shown in FIG. 10, the correction algorithm of the present disclosure may be applied to a multi-robot system in which several autonomous robots are used. For example, when three autonomous robots are used, each robot may use an individually learned autonomous traveling model. If performance deteriorates due to noise occurring in the real environment, correction may be individually performed using the unsupervised learning method described above. In addition to individual correction of each robot, an additional correction method as shown in FIG. 9 may be applied.

That is, each autonomous robot individually generates a map and then transmits the generated map to the control device 300. The control device 300 may perform integrated correction based on the map transmitted by each autonomous robot, transmit this back to each autonomous robot, calculate the 2D map-based correction function, and then correct the position estimation model of the robot.

The position correction method according to an embodiment of the present disclosure may also be implemented in the form of a recording medium including instructions executable by a computer, such as a program module executed by a computer. Computer-readable media may be any available media that may be accessed by a computer and includes all of volatile and non-volatile media, and removable and non-removable media. In addition, computer-readable media may include computer storage media. The computer storage media include all of volatile and non-volatile, removable and non-removable media implemented in any method or technology for storage of information such as computer-readable instructions, data structures, program modules or other data.

Although the methods and systems of the present disclosure have been described with respect to specific embodiments, some or all of their components or operations may be implemented using a computer system having a general-purpose hardware architecture.

The description of the present disclosure described above is for illustrative purposes, and those skilled in the art will understand that the present disclosure may be easily modified into other specific forms without changing the technical idea or essential characteristics of the present disclosure. Therefore, the embodiments described above should be understood in all respects as illustrative and not restrictive. For example, each component described as unitary may be implemented in a distributed manner, and similarly, components described as distributed may also be implemented in a combined form.

The scope of the present disclosure is indicated by the claims described below rather than the detailed description above, and all changes or modified forms derived from the meaning and scope of the claims and their equivalent concepts should be construed as being included in the scope of the present disclosure.

EXPLANATION OF SYMBOLS

100: autonomous robot
110: control unit
120: driving unit
130: camera
140: traveling distance measurement sensor
150: communication module
200: operation control program
210: operation agent
230: style-transfer model
300: control device

What is claimed is:

1. An autonomous robot comprising:
a driving unit that moves the autonomous robot;
a camera;
a traveling distance measurement sensor; and
a control unit that executes an operation control program to control an operation of the autonomous robot through the driving unit and estimates a location of the autonomous robot using a captured image and traveling distance information collected through the camera and the traveling distance measurement sensor,
wherein the operation control program generates a robot viewpoint map based on the image captured by the camera at each time point through an operation agent, estimates a location of the autonomous robot based on the robot viewpoint map and the measured traveling distance information, and generates a global map based on the robot viewpoint map and position estimation information, and
the operation control program inputs the generated robot viewpoint map and global map into a style-transfer model, and inputs a style-transferred robot viewpoint map and a style-transferred global map output by the style-transfer model into the operation agent to correct the estimated position.

2. The autonomous robot of claim 1, wherein
the operation control program generates a style-transferred robot viewpoint map at a time point t based on a robot viewpoint map at the time point t, and re-estimates a position at the time point t based on distance measurement information at the time point t and the style-transferred robot viewpoint map at the time point t to correct a position estimation value at the time point t.

3. The autonomous robot of claim 1, wherein
the operation control program generates a style-transferred robot viewpoint map at a time point t based on a robot viewpoint map at the time point t, and re-estimates a position at the time point t based on the distance measurement information at the time point t and the style-transferred robot viewpoint map at the time point t to correct a position estimation value at the time point t, transfers the robot viewpoint map at the time point t based on the corrected position estimation value, and merges the robot viewpoint map to a style-transferred global map at a time point t−1 to generate a global map at the time point t.

4. The autonomous robot of claim 1, wherein
the style-transfer model is learned such that a style of a first image set is applied to a second image set between the first image set including a robot viewpoint map or a global map corresponding to a ground truth and the second image set including a robot viewpoint map or a global map generated in a real environment including noise.

5. The autonomous robot of claim 4, wherein
the style-transfer model is learned based on a CycleGan model.

6. The autonomous robot of claim 4, wherein
the operation agent includes a first map generation model that generates the robot viewpoint map, and a second map generation model that estimates the location of the autonomous robot and generates a global map,
the first map generation model is learned based on a robot viewpoint map style-transfer loss function that minimizes a difference between the input robot viewpoint map included in the second image set and the output robot viewpoint map style-transferred according to the input of the input robot viewpoint map, and
the second map generation model is learned based on a global map style-transfer loss function that minimizes a difference between the input global map included in the second image set and the output global map style-transferred according to the input of the input global map.

7. The autonomous robot of claim 6, wherein
the first map generation model is learned by further considering a loss function that ensures flip consistency which minimizes a difference when the image captured by the camera is flipped in a horizontal direction, and
the loss function that ensures the flipping consistency minimizes a difference between the characteristics extracted for the captured image being flipped and the characteristics extracted after the captured image is flipped.

8. The autonomous robot of claim 6, wherein
the second map generation model is learned by further considering a loss function that ensures time difference consistency that minimizes a difference between the global map at a current time point and the global map at a previous time point.

9. A position correction method of an autonomous robot, comprising:
receiving a captured image and traveling distance information for each viewpoint from a camera and a traveling distance measurement sensor installed on the autonomous robot;
generating a robot viewpoint map based on the captured image through an operation agent, estimating a location of the autonomous robot based on the robot viewpoint map and the measured traveling distance information, and generating a global map based on the robot viewpoint map and position estimation information;
inputting the generated robot viewpoint map and global map into a style-transfer model and outputting the style-transferred robot viewpoint map and the style-transferred global map; and
correcting the position estimated in the generating of the robot viewpoint map based on the style-transferred robot viewpoint map and the style-transferred global map.

10. The position correction method of an autonomous robot of claim 9, wherein, in the correcting of the position,
a style-transferred robot viewpoint map at a time point t is generated based on a robot viewpoint map at the time point t, and a position at the time point t is re-estimated based on distance measurement information at the time point t and the style-transferred robot viewpoint map at the time point t to correct a position estimation value at the time point t.

11. The position correction method of an autonomous robot of claim 9, wherein, in the correcting of the position,
the robot viewpoint map at the time point t is transferred based on the corrected position estimation value, and merges the robot viewpoint map is merged to a global map at a time point t−1 to generate a global map at the time point t.

12. The position correction method of an autonomous robot of claim 9, wherein
the style-transfer model is learned such that a style of a first image set is applied to a second image set between the first image set including a robot viewpoint map or a global map corresponding to a ground truth and the second image set including a robot viewpoint map or a global map generated in a real environment including noise.

13. The position correction method of an autonomous robot of claim 9, wherein
the style-transfer model is learned based on a CycleGan model.

14. The position correction method of an autonomous robot of claim 11, wherein
the operation agent includes a first map generation model that generates the robot viewpoint map, and a second map generation model that estimates the location of the autonomous robot and generates a global map,
the position correction method further comprising further learning the first map generation model and the second map generation model based on the style-transferred robot viewpoint map and the style-transferred global map,
the first map generation model is learned based on a robot viewpoint map style-transfer loss function that minimizes a difference between the input robot viewpoint map included in the second image set and the output robot viewpoint map style-transferred according to the input of the input robot viewpoint map, and the second map generation model is learned based on a global map style-transfer loss function that minimizes a difference between the input global map included in the second image set and the output global map style-transferred according to the input of the input global map.

15. The position correction method of an autonomous robot of claim 14, wherein, in the further learning of the first map generation model and the second map generation model, when the first map generation model is learned, the first map generation model is further learned by further considering a loss function that ensures flip consistency which minimizes a difference when the image captured by the camera is flipped in a horizontal direction, and the loss function that ensures the flipping consistency minimizes a difference between the characteristics extracted for the captured image being flipped and the characteristics extracted after the captured image is flipped.

16. The position correction method of an autonomous robot of claim 14, wherein in the further learning of the first map generation model and the second map generation model, when the second map generation model is further learned, the second map generation model is further learned by further considering a loss function that ensures time difference consistency that minimizes a difference between the global map at a current time point and the global map at a previous time point.

17. A non-transitory computer-readable recording medium on which a computer program for performing the position correction method of an autonomous robot of claim 9 is recorded.

* * * * *